Sept. 6, 1966 L. W. HORVATH 3,270,755
PORTABLE HANGAR
Filed July 25, 1963 2 Sheets-Sheet 1

INVENTOR.
Louis W. Horvath
BY Dawson, Tilton, Fallon
Lungmuir Alexander Attys

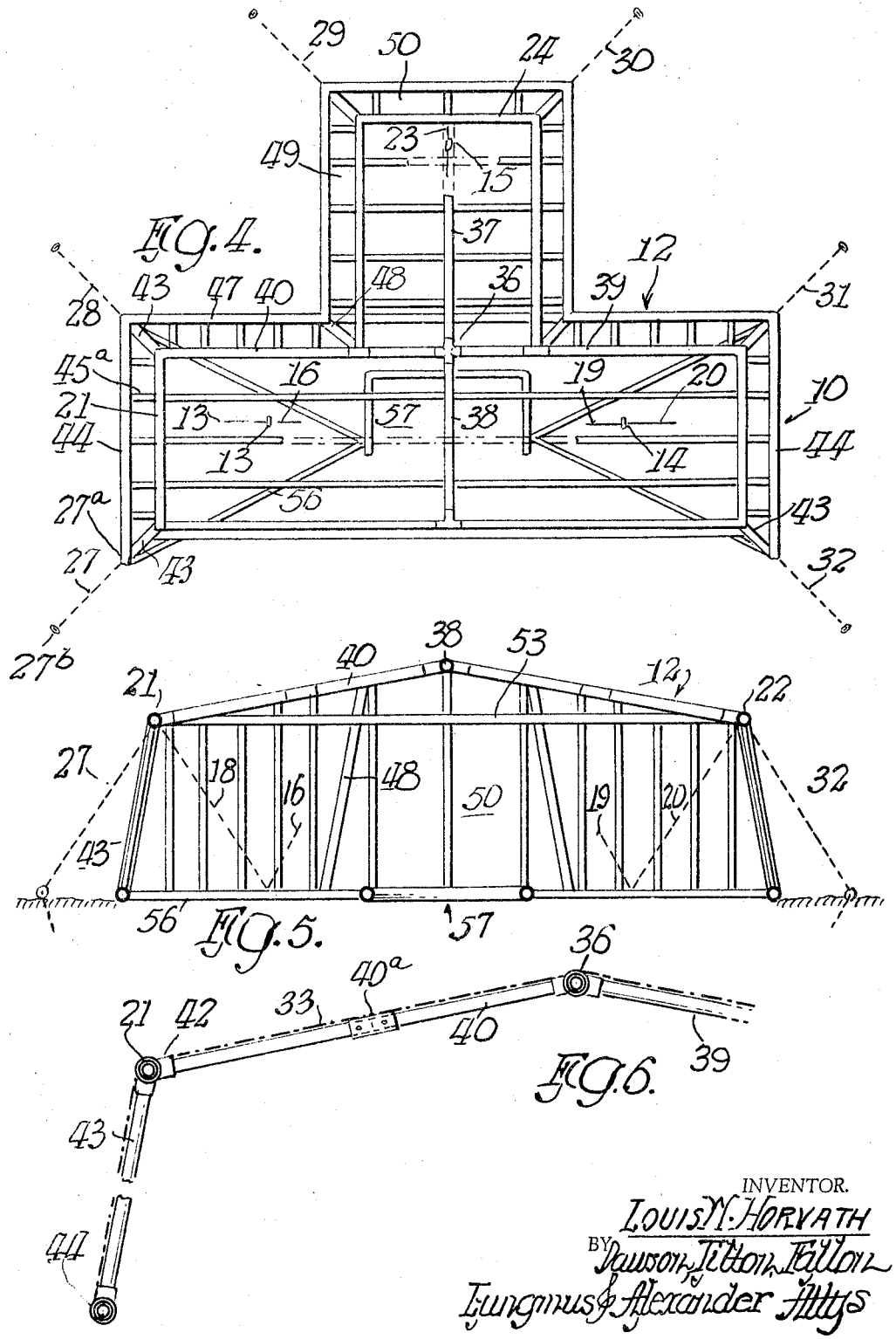

United States Patent Office 3,270,755
Patented Sept. 6, 1966

3,270,755
PORTABLE HANGAR
Louis W. Horvath, 3306 Hutchens Ave., Huntsville, Ala.
Filed July 25, 1963, Ser. No. 297,527
1 Claim. (Cl. 135—1)

This invention relates to a portable hangar and, more particularly to a protective enclosure for aircraft, and the like, having unique structural stability in one condition, while being collapsible to another condition for ready transportability or storage.

The objectives of portability when not in use, and structural stability when in use, are in conflict. Heretofore, it has been necessary to emphasize one aspect of an enclosure to the detriment of the other. Structural bolstering necessary for stabilizing the enclosure against weather, wind, etc., meant difficulty in dismantling for storage or transport. On the other hand, a readily collapsible structure lacked the necessary strength to withstand the elements. The reconciliation of these two objectives in a single structure thus constitutes an important object of this invention.

Another object of the invention is to provide a novel enclosure for aircraft, or the like, which is anchorable to the three tie-down rings provided in open spaces for the storage of aircraft. Here, it will be appreciated that hangar space is usually not provided for small private aircraft, but that these planes are anchored by triangularly spaced rings fastened to the ground or other surface for securement to the wings and tail of the aircraft.

Still another object of the invention is to provide an aircraft enclosure which embodies unique framing, particularly in the base thereof, which permits ready ingress and egress of the vehicle being protected by the enclosure supported by the framing.

Other objects and advantages of the invention may be seen in the details of construction and operation set down in this specification.

The invention is explained in conjunction with an illustrative embodiment in the accompanying drawing, in which:

FIG. 4 is a plan elevational view of the framing portion of the enclosure seen in FIGS. 1–3;

FIG. 5 is a front elevational view of the enclosure framing of FIG. 4;

FIG. 6 is an enlarged fragmentary view of the part seen in FIG. 5; and

Figure 1:
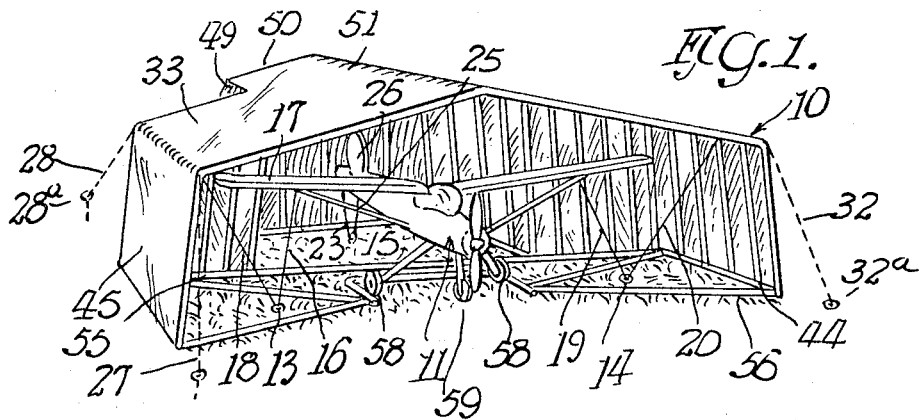
FIG. 1 is a perspective view of the inventive enclosure, seen with a small private aircraft housed therein, but with the front door flaps removed to permit viewing the interior.

In the illustration given, the numeral 10 designates generally the inventive enclosure, which is seen in FIG. 1 to house an aircraft designated 11. The enclosure 10 is essentially T-shaped, as can be appreciated from a consideration of FIG. 4 wherein the supporting framework is seen and is generally designated 12.

In both FIGS. 1 and 4, the forward tie-down rings are designated 13 and 14, the numeral 13 being applied to the starboard tie-down ring, while the numeral 14 is applied to the port tie-down ring. In FIG. 4, the after tie-down ring is designated 15.

Referring again to FIG. 1, it is seen that the starboard tie-down ring 13 is connected by means of a guy wire 16 to the starboard wing 17 and to the enclosure 10 by means of guy wire 18. In like fashion, the port tie-down ring 14 is connected to the port wing by means of guy wire 19 and to the port side of the enclosure 10 by means of wire 20. The wires 16, 18, 19 and 20 are also seen in dotted line in FIG. 5. In FIG. 5, it will be noted that the wires 18 and 20 are connected at their upper ends to the right and left top stringers 21 and 22, respectively. Thus, the guy wires 18 and 20 extend angularly outwardly and upwardly. In similar fashion, a guy wire 23 is connected between the after ring 15 and the rear top stringer 24 (see FIG. 4), while a short guy wire designated 25 and seen only in FIG. 1 is connected between the after ring 15 and the tail 26 of the aircraft 11.

If desired, additional guying may be provided by corner wires as at 27–32 in FIG. 4, the respective wires being connected to the corners of the enclosure 10 and to suitably removable eye-stakes. See, for example, 27a and 27b, respectively, relative to the guy wire 27.

Figure 3:
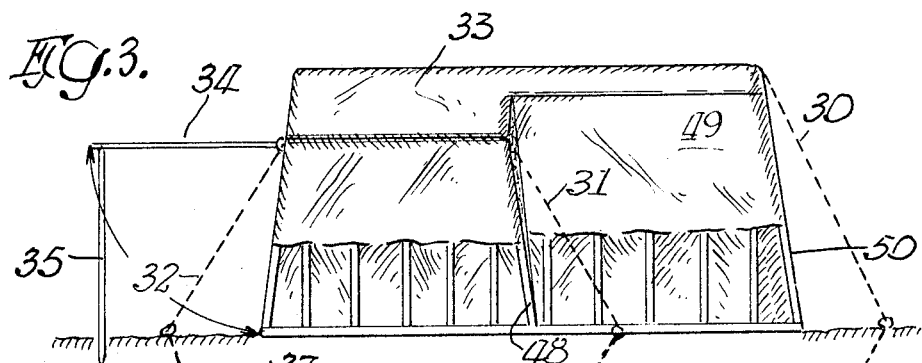
FIG. 3 is a side elevational view as seen from the sight line 3—3 of FIG. 2.

The enclosure 10 includes, besides the framing 12, a canvas cover designated 33 which is suitably shaped to cover the framing 10. Additionally, the cover 33 may be arranged to provide a door closure 34, seen only in FIG. 3, and maintained in the open position by means of a prop or standard 35.

Figure 2:
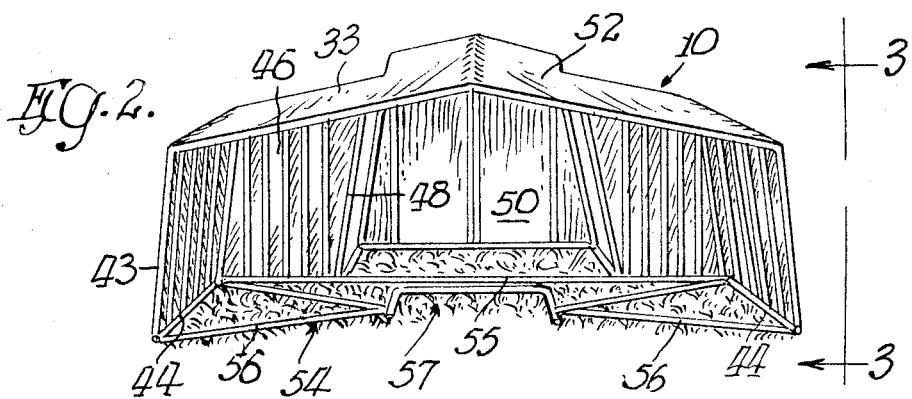
FIG. 2 is a front perspective view of the structure of FIG. 1, but with the aircraft removed.
Figure 7:
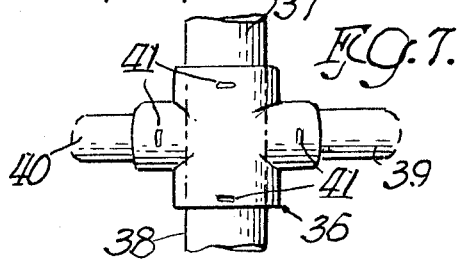
FIG. 7 is an enlarged fragmentary view of a typical connection fitting employed in the framework seen in the preceding views.

The details of the framing can be best appreciated from a consideration of FIGS. 4–7. In FIG. 7, for example, a cross 36 is seen which connects two portions of the ridge pole as at 37 and 38 with the laterally-extending rafter pieces 39 and 40. Cotter pins as at 41 are provided at all connections. The top stringers 21 and 22 are connected at the ends of the rafter pieces by suitable T's at 42 in FIG. 6. If desired, the portions of the rafter pieces may be interconnected by sleeves as at 40a. Further, the stringers 21 are supported by suitable studs as at 43 connected to the bottom tubular plates as at 44, again by way of suitable T's. The studs 43 are seen to be outwardly and downwardly inclined. Thus, the starboard wing wall 45 (see FIG. 1) is supported by the two studs 43, the stringer 21, and the plate 44. Additional braces as at 45a may be provided. The starboard wing rear wall 46 (see FIG. 2) is defined and supported by the plate 47, the rafter piece 40, the stud 43, and a second stud 48.

In like fashion, there is provided a starboard tail wall 49 and a tail end wall 50. The port side walls, in the illustration given, duplicate the starboard side walls. Additionally, there is provided framing defining a starboard top wall 51 and a port top wall 52 (see FIGS. 1 and 2). Both of the top walls are inclined upwardly toward the ridge poles 36 and 37, with the top walls being stabilized by means of a lower truss member 53.

Additionally advantageous is the base frame generally designated 54 (see FIG. 2), which is interconnected with the bottom tubular beams or plates 44 and the transverse base beam 55. The base frame 54 is characterized by a central recessed portion as at 57 interconnected with triangular portions 56 and which provides a convenient positioning means for the wheels 58 of the aircraft. Thus, it will be seen that the wheels 58, along with the balance wheel 59, need not be moved over any of the base framing in moving the aircraft into the enclosure.

The inclined walls, besides providing greater structural strength for the lightweight framing, help prevent the creation of pocket-type "bulges" of the cover material during high wind conditions. The walls also support the relatively flexible cover material, thus retarding the "flopping action" often observed on vertical tent walls, even during light breezes.

In operation, due to the dimensional integrity of the die-cast corner members and T's, the slide fit assembly and the cotter pinning of the tubular support members make assembly convenient, an operation involving a few hours.

While in the foregoing specification a detailed description of an embodiment of the invention has been set down for the purpose of illustration thereof, many variations in the details herein given may be made by those skilled in the art without departing from the spirit and scope of the invention.

I claim:

A portable hangar, comprising a dismantleable frame having a general T shape in plan and arranged to enclose an aircraft, a flexible covering for said frame, and means for connecting said frame to the three spaced tie-down rings of a landing field, said frame including a base portion adapted to contact the ground, said base portion including bracing members arranged to define an aircraft wheel access space.

References Cited by the Examiner
UNITED STATES PATENTS

| | | | |
|---|---|---|---|
| 2,168,913 | 8/1939 | Middleton | 135—1 |
| 2,511,974 | 6/1950 | Finken et al. | 189—1.5 X |
| 2,520,055 | 8/1950 | Pomerance | 189—1.5 X |
| 2,636,457 | 4/1953 | Finlay | 189—1.5 X |
| 2,789,570 | 4/1957 | Liden | 135—1 |

HARRISON R. MOSELEY, *Primary Examiner.*

L. J. SANTISI, *Assistant Examiner.*